UNITED STATES PATENT OFFICE.

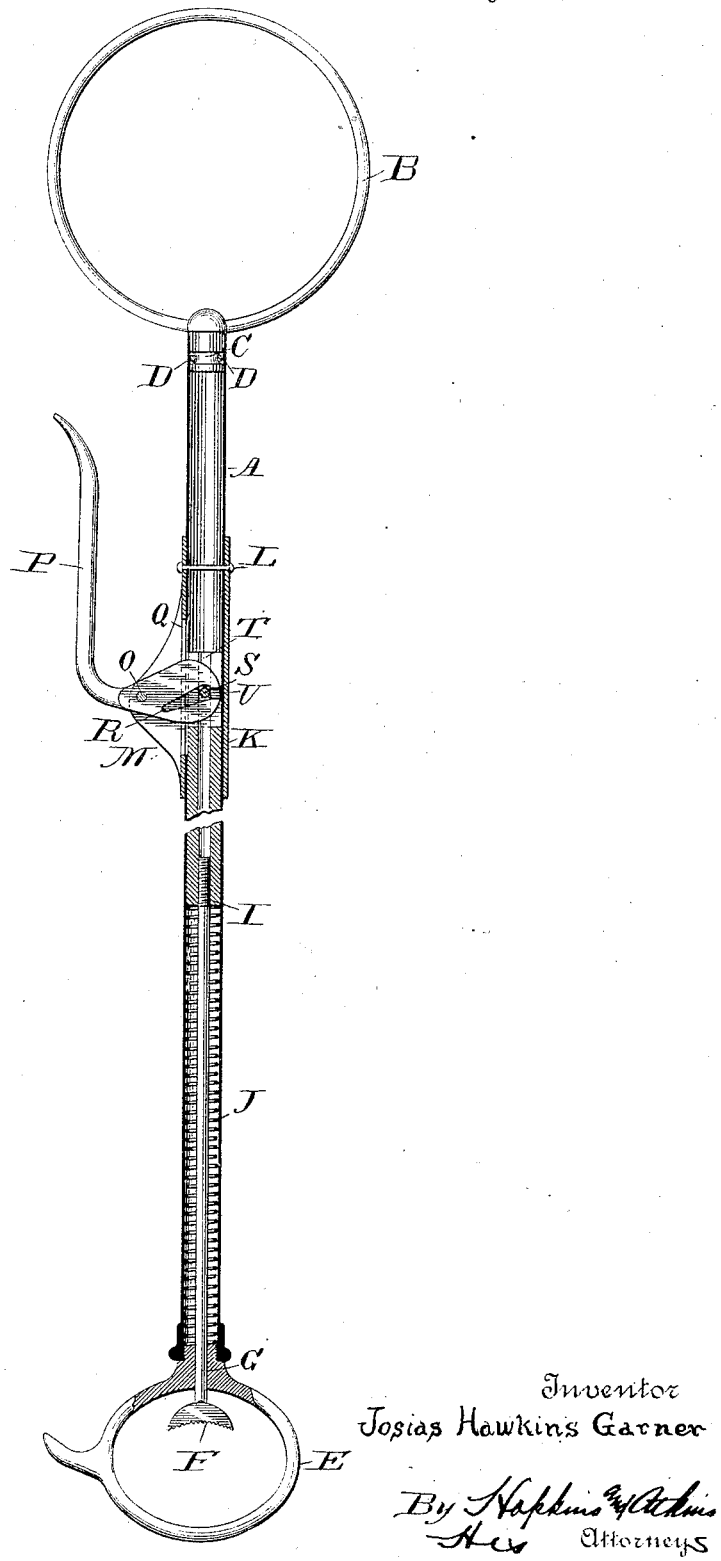

JOSIAS HAWKINS GARNER, OF BIRMINGHAM, ALABAMA.

CAR-COUPLING TOOL.

SPECIFICATION forming part of Letters Patent No. 433,283, dated July 29, 1890.

Application filed January 23, 1890. Serial No. 337,848. (No model.)

*To all whom it may concern:*

Be it known that I, JOSIAS HAWKINS GARNER, of the city of Birmingham, county of Jefferson, and State of Alabama, have invented certain new and useful Improvements in Coupling and Uncoupling Sticks for Railway-Cars, of which the following is a specification, reference being had to the accompanying drawing.

My invention consists of certain improvements upon the patent, No. 408,158, granted July 30, 1889, to Fletcher W. Beall, by which his stick can be made of greater strength and durability and at considerable less cost.

The object of my invention is to provide a handle by which the stick can be readily carried upon the arm, for instance.

In the device illustrated in the above-mentioned patent the lever which controls the grip-slide is borne upon bearings secured to the stick by bands sliding over it. This lever operates a slide within the hollow stick, which impinges against the grip-slide to operate it.

By my device I do away with the separate slide, which in use is found to be unnecessary and objectionable. I also provide a collar around the stick, upon which is borne the lever for operating the grip-slide, and by this means I secure a firmer bearing and am able to pivot the lever so as to secure greater leverage. I also provide an opening into the slot which actuates the grip-slide, and by this means am able to use the collar-fastening for the bearings of the lever, and to readily place the lever in position or remove it at will. The use of the collar-fastening incloses the working parts, so as to prevent their becoming gummed up with dirt, and also prevents the necessity of cutting the stick at more than one place.

In the accompanying drawing I show a section of my improved stick.

Referring to the letters upon the drawing, A indicates a tube provided at one end with a swivel-ring or arm-handle B, which is preferably united to the stick by means of the groove C and the pins D, secured to the stick and passing through the groove, so as to allow the handle to be rotated. At the opposite end of the stick is secured another ring or head E, which in use is adapted to be placed around the head of the coupling-pin. Within this ring projects the grip F, which is secured to the longitudinally-slotted rod G, which, with the ring E, constitutes the gripping device. The rod G is provided with a shoulder I, upon which is seated at one end the spring J, which is seated at its other end upon the top of the ring E, as shown in the drawing.

K indicates a collar adapted to slip over the tube A, to which it may be secured by the bolt L. This collar is provided with bearings M, to which is pivoted at O the trigger P. The head of this trigger works in a slot Q in the tube A, and is provided with a slot R, within which works the pin S.

T indicates a slot in the end of the sliding rod G, arranged so that when the trigger is moved backward and forward the rod is caused to slide longitudinally within the tube A.

U indicates an opening into the slot R, so located that when the collar is slipped along to the tube A the trigger may be pressed down over the pin S and be readily secured in place. It will be observed that the opening U enters the slot R, so as to leave a bearing in the slot for the pin S.

What I claim is—

1. The combination, with a coupling and uncoupling stick provided with a gripping appliance at one end, of a swivel-ring secured to the other end and adapted to be conveniently slipped over the arm for the purpose of carrying the stick, substantially as set forth.

2. In a coupling and uncoupling stick, the combination, with a longitudinally-sliding rod adapted to slide upon the stick, of a trigger movably secured to the stick and connected immediately with said rod, for the purpose of actuating it, substantially as set forth.

3. In a coupling and uncoupling stick consisting of the tube A, extending from the handle of the stick to the gripping device, the combination, with a longitudinally-moving rod and a trigger for actuating the same, of a collar adapted to slip over the tube A and to be secured to it and provided with bearings for the trigger, substantially as set forth.

4. In a coupling and uncoupling stick consisting of an outside tube and a longitudinally-movable rod inclosed within the outside tube, of a trigger moving upon suitable bearings upon the outside tube and provided with a slot R, and an opening U into the slot, substantially as set forth.

In testimony of all which I have hereunto subscribed my name.

JOSIAS HAWKINS GARNER.

Witnesses:
G. W. FOLGER,
J. P. DE LO.